United States Patent
Hodge

[19]

[11] Patent Number: 5,913,647
[45] Date of Patent: Jun. 22, 1999

[54] FASTENER TENSION INDICATOR

[75] Inventor: Malcolm H. Hodge, West Hartford, Conn.

[73] Assignee: Structural Integrity Monitoring Systems, Inc., Willimantic, Conn.

[21] Appl. No.: 08/771,087

[22] Filed: Dec. 20, 1996

[51] Int. Cl.[6] ................................................... F16B 31/02
[52] U.S. Cl. .......................... 411/11; 411/14; 411/917; 116/DIG. 34
[58] Field of Search ..................... 411/8–11, 14, 411/916, 917; 73/761; 116/DIG. 34

[56] References Cited

U.S. PATENT DOCUMENTS

| | | | |
|---|---|---|---|
| 3,060,731 | 10/1962 | Adise | 411/14 X |
| 3,104,645 | 9/1963 | Harrison . | |
| 3,469,492 | 9/1969 | Dahl . | |
| 4,047,463 | 9/1977 | Coldren . | |
| 4,131,050 | 12/1978 | Holmes . | |
| 4,164,164 | 8/1979 | Trungold . | |
| 4,303,001 | 12/1981 | Trungold . | |
| 4,483,648 | 11/1984 | Trungold . | |
| 4,773,272 | 9/1988 | Trungold . | |
| 5,199,835 | 4/1993 | Turner . | |
| 5,385,054 | 1/1995 | Kramer . | |

FOREIGN PATENT DOCUMENTS 380447   9/1964   Switzerland ............................. 411/10

*Primary Examiner*—Neill R. Wilson
*Attorney, Agent, or Firm*—Murtha, Cullina, Richter and Pinney

[57] ABSTRACT

A mechanical sensor for use with bolts, nuts, eye bolts and other fasteners is provided to sense fastener tension and to mechanically indicate that tension and changes therein by mechanically measuring deformation of the substrate being clamped by the fastener relative to the distortion or lack thereof in the substrate immediately adjacent the deformed substrate. The differential substrate deformation produces measurable and often clearly visible movement of a portion of the sensor. Such movement may be interrogated through utilization of visual, optical, electro-optical means as desired.

21 Claims, 4 Drawing Sheets

FASTENER TENSION INDICATOR

FIELD OF THE INVENTION

This invention generally relates to a device for indicating fastener tension and is more particularly directed to a mechanical device that cooperates with a fastener to provide an indication of fastener tension as a result of clamp load forces exerted on a substrate by the fastener by sensing and amplifying differential substrate associated distortion with the fastener caused compressive load on a substrate.

BACKGROUND OF THE INVENTION

Bolts, nuts and washers are common parts of any fastening system for securing two or more metal members together, for securing a tension cable to an anchor or base metal or any of a wide variety of elements that must reliably secure two elements together under a predetermined load. Heretofore the monitoring of the clamp load force has been dependent upon sophisticated bolt load analyzers using personal computers or even personal workers who periodically "torque" a nut to ensure that it is exerting the proper clamping load. In my co-pending application entitled CLAMP LOAD INDICATOR, Ser. No. 08/729203, filed Oct. 15, 1996 there is disclosed an indicator utilizing a phenomenon generally referred to as "dishing" to monitor the clamp load of a fastener which invention permits an all mechanical indicator if desired. Moreover the usual technique is to monitor bolt tension and elongation rather than compression of the jointed surface. Nonetheless, portions of that application are incorporated herewith when necessary to complete the description.

OBJECTS OF THE INVENTION

It is a primary object of this invention to provide a fastener tension indicator which indicates differential substrate distortion between the substrate clamped by the fastener and the distortion at the unclamped substrate immediately adjacent to the fastener clamped substrate.

It is an additional object to provide a one piece sensing device for indicating tension in a fastener which device is susceptible of easy installation with minimal intrusion into the conventional fastening system and which can be used with the bolt head, nut, or as desired.

It is another object of this invention to provide a low cost, easily installed device for monitoring fastener tension and substrate clamp loads in situ, which device can produce a visible indication as well as remote sensing of a reduction in tension of the fastener and therefore of substrate clamp loads and is suitable for use with conventional nut-bolt washer combinations, eye bolts, cable tension and other conventional fastener applications to present restoration of the desired clamping tension.

Other objects will be in part obvious and in part pointed out more in detail hereinafter.

SUMMARY OF THE INVENTION

This invention discloses in a preferred embodiment a one piece fastener tension indicator for fasteners applying a clamp load to a substrate by utilizing differential substrate distortion between the substrate clamped by the fastener such as a bolt head, rivet head or nut of a fastener under a tensile clamp load and the unclamped substrate immediately adjacent to the fastener clamped substrate, a first indicator portion engaged by the clamped substrate and a second indicator portion connected to the first indicator portion and intimately engaged with the substrate closely adjacent to the clamp load distorted substrate such that the differential distortion of the substrate causes the second indicator portion to move relative to the first indicator portion to signal or indicate a change in fastener tension.

The compression of the substrate directly below the fastener causes a measurable and predictable deformation of that substrate portion which is sensed and mechanically amplified to provide a visible indication of the change in differential compression of the substrate between the stressed and unstressed portion. Interrogation and reading of that indication of change can be visual, optical, electro-optical, etc. as desired.

A better understanding of the objects, advantages, features, properties and relations of the invention will be obtained from the following detailed description and accompanying drawings which set forth certain illustrative embodiments and are indicative of the various ways in which the principles of the invention are employed.

DESCRIPTION OF THE INVENTION

Figure 1:
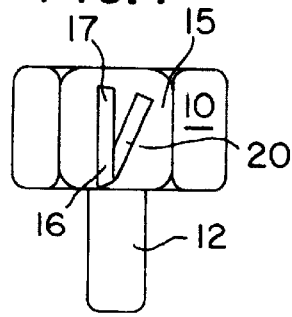
FIG. 1 is an elevation view of a headed fastener with a lateral fastener tension indicator of a preferred embodiment of this invention.
Figure 2:
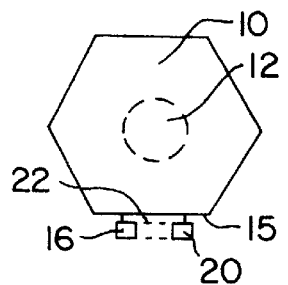
FIG. 2 is a top plan view of the fastener of FIG. 1.

Before describing preferred embodiments of the invention, the underlying philosophy of the invention should be stated, namely, that compression of the substrate directly below the fastener causes the measurable and predictable deformation of that substrate portion which is sensed and mechanically amplified to provide a visible indication in the change in differential compression of the substrate between the stressed and unstressed portion. In furtherance of that philosophy, attention is first directed to FIGS. 1, 2 and 3 as being exemplary of a preferred embodiment of the invention. FIG. 1 discloses a standard bolt head 10, generally hexagonal, and a shank 12 (preferably threaded) extending from the bolt head into the substrate which is to be clamped as, for example, by a suitable nut not shown. One face of bolt 10 is identified by the numeral 15 and includes a foot 16 and an integral indicator arm 17 shown in the upright position, the same elements being shown in the tilted position as indicated by the numeral 20. FIG. 2 shows the general hex shaped top plan view configuration and identifies the shank 12 in dotted lines. The indicator 16 is shown pivoted as at 22 in a suitable aperture provided in face 15 of the fastener 10, the dotted line configuration conforming to the position 20 as will be hereinafter explained.

Figure 3:
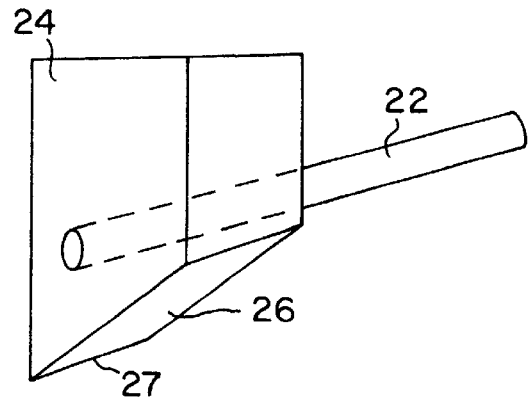
FIG. 3 is an enlarged perspective view of the lateral indicator of FIGS. 1 and 2.
Figure 4:
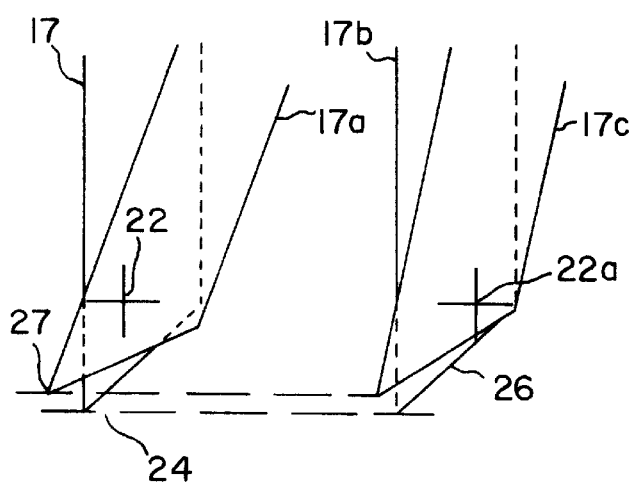
FIG. 4 is a schematic view illustrating the operation of the indicator of FIG. 3.

Referring next to FIG. 3 which is an enlarged perspective view of the lateral indicator 16, 17, it is seen that axle 22 is secured to a foot 24 formed of suitable material such as, for example, plastic, and it provided with a face 26 which is oblique to the remainder of the foot and terminates at an edge 27. For purposes of illustrative explanation, the shaft 22 can be free to rotate in bolt head 10 or it can be fixed therein so as to provide a torsional action for the foot 24. As best seen in FIG. 4, we see two views of the action of the foot as it engages the uncompressed portion of the substrate. The upright portion shown in solid lines shows engagement with the uncompressed substrate 24 for rotation about the axle 22 indicated by the "cross" center line which axle follows the fastener as the substrate compresses. The position of that center line relative to the indicator 16 determines the range of indicator movement. For example with the location of the center at 22, the range of motion of the arm 17 to its tilted position 17a is greater than the position shown at 17b with a lesser rotation to the position shown at 17c. In other words by properly selecting the pivot point 22 for the foot, the obliquely angled end 26 brings the edge 27 into engagement with the substrate immediately adjacent to the bolt head such that the movement seen by comparable compressive movements results in arm position 17a being somewhat greater than that of arm position 17c. It is nonetheless clear that as the fastener serves to compress the material under the bolt head, the foot engages the unstressed portion of the substrate and the axle 22 travels downwardly with substrate compression thereby leaving the end 27 in contact with the unstressed substrate to thereby tilt the indicator laterally and provide a visible indication of differential substrate compression.

Figure 5:
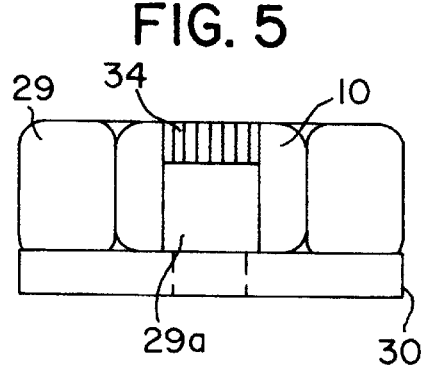
FIG. 5 is an elevation view of a protective housing for the fastener of FIG. 1 showing an optional optical grid.
Figure 6:
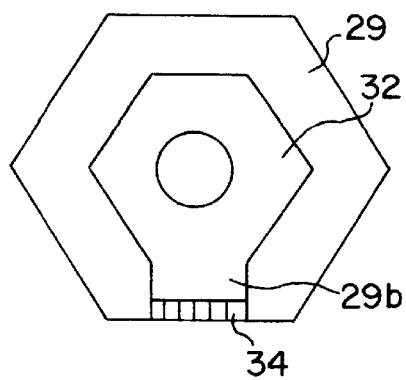
FIG. 6 is a top plan view of the protective housing of claim 5.
Figure 9:
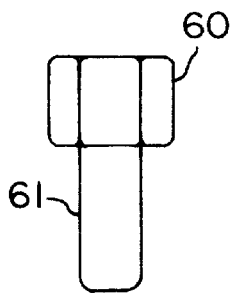
FIG. 9 is an elevation view of a hexagonal head fastener suitable for this embodiment of the invention.
Figure 10:
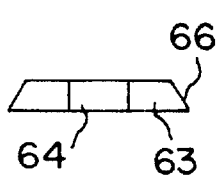
FIG. 10 is an elevation view of an upper pivot washer.

FIGS. 5 and 6 disclose a modification including an enclosure or housing 29, the enclosure being relieved at one face 29a so as to accommodate the pivoting or laterally moving indicator 17 in the space generally designated 27b and if desired, a calibration washer 30 can be provided as an integral or separate member of the protective enclosure 29 such that the bolt head 10 and shank 12 can drop into the recess 32 with the indicator 16 received in the relieved area. For completeness a dotted line showing of an optical grid 34 is provided so that, if desired, a remote readout of lateral arm position caused by substrate deflection can be read photo-optically or electro-optically.

Figure 7:
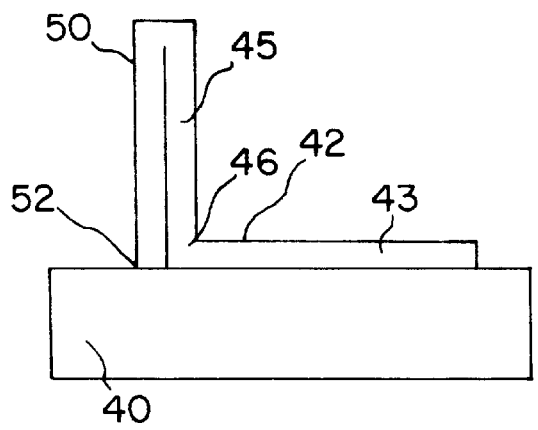
FIG. 7 is a schematic enlarged side elevation view of a second embodiment of this invention.
Figure 8:
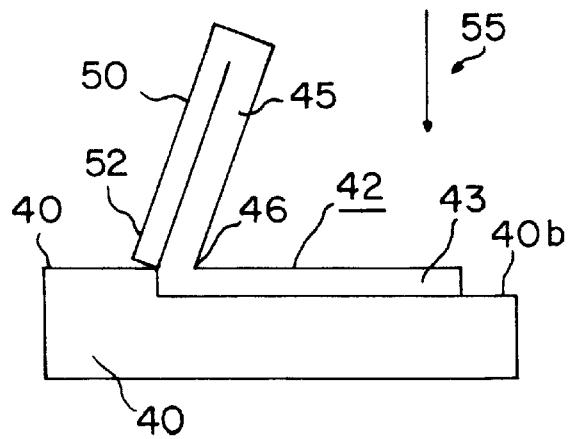
FIG. 8 is a view similar to FIG. 7 after compression of the substrate.
Figure 17:
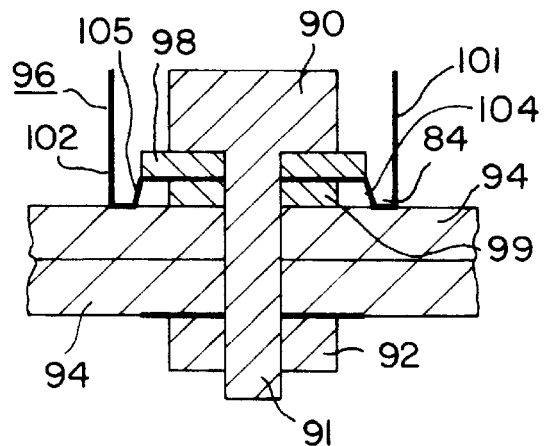
FIG. 17 is a schematic cross-sectional view of a further embodiment of this invention.
Figure 18:
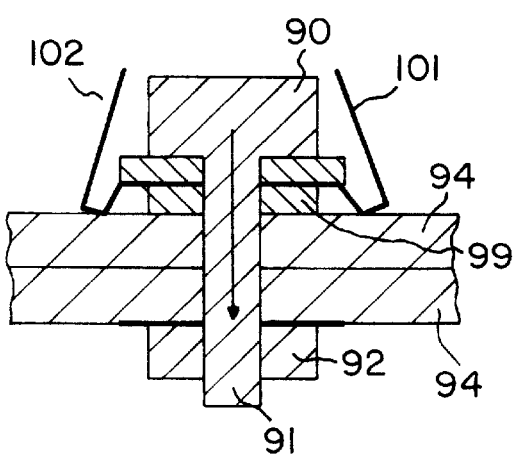
FIG. 18 is a schematic view of the embodiment of FIG. 17 in the fastener tensioned position.

Turning next to the embodiment shown in FIGS. 9 through 16, attention is first directed to FIGS. 7 and 8 which schematically show the fundamentals of what has been called a "bobby pin" indicator. A substrate 40 is indicated in FIG. 7 in the uncompressed condition and an indicator generally designated 42 is provided having a first indicator portion 43 in intimate engagement with substrate 40, an upstanding arm 45 which can be suitably joined to arm 43 at a pivot point 46 and a reversely bent portion 50 connected to the arm 45 whose distal portion 52 engages substrate 40. As a compressive load is exerted in the direction of arm 55 by suitable fastener, the substrate is compressed under arm 43 by an amount as seen between the difference at 40a and 40b of this substrate thereby causing the distal end 52 to engage the unstressed portion of substrate 40 and to exert a force which pivots the arm 45 about the pivot point 46 thereby indicating the relative stressing brought about by a fastener exerting a force in the direction 55 so as to create an unbalanced substrate distortion with the indicator portion moving to visibly indicate that unbalances stressed. If the system remains within the elastic limits, removal of the compressive force 55 will permit the compressed substrate and the arm 45 to return to the position of FIG. 7.

Figure 11:
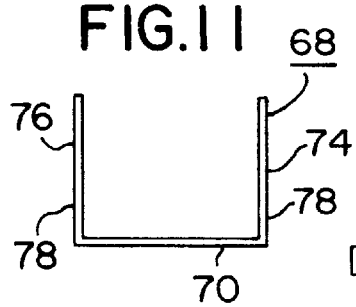
FIG. 11 is an elevation view of the clamp load indicator washer of this embodiment.
Figure 12:
FIG. 12 is an elevation view of the lower calibration washer of this embodiment.
Figure 13:
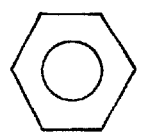
FIGS. 13, 14, 15 and 16 are top plan views of the elements illustrated in FIGS. 7, 8, 9, 10, 11 and 12.

Turning now to FIGS. 9 through 16, a typical commercial embodiment is shown having a hex head bolt generally designated 60 with the conventional threaded shank 61 which cooperates with an apertured upper pivot washer 63. The aperture 64 receives shank 61 and washer 63 is a truncated cone shape to present an edge 66 about which clamp load washer 68 deflects. As best seen in FIG. 11 clamp load washer generally designated 68 has an apertured base portion 70 extending radially outwardly from the central aperture 72 to two arms generally designated 74 and 76. In reality the arms 74 and 76 comprise reversely bent portions such that the outer arms 78 engages the uncompressed substrate much as described in connection with FIGS. 7 and 8. FIG. 12 shows an apertured lower calibration washer 80 that can be used to define a common data plane. Washer 80, in effect, is the substrate which is partially compressed under the head of the fastener 60 and uncompressed adjacent the washer 70 so that the distal portions of the arm 78 engage the uncompressed calibration washer to provide tilting of the arms 68 and thereby visible indication of the tension in the fastener 60.

Figure 14:
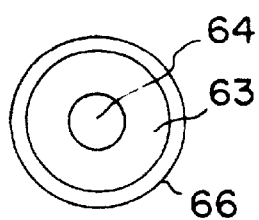
Figure 15:
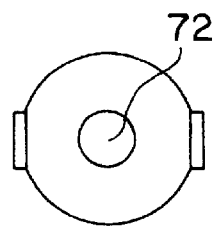
Figure 16:
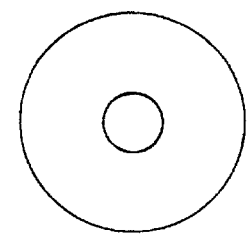

It is to be understood that the use of the washers shown in FIGS. 14 and 16 are optional but do provide a controlled environment under which a fastener tension indicator 70 can engage both clamped and unclamped portions of a substrate to effect arm movement all as seen schematically in FIG. 8.

Figure 19:
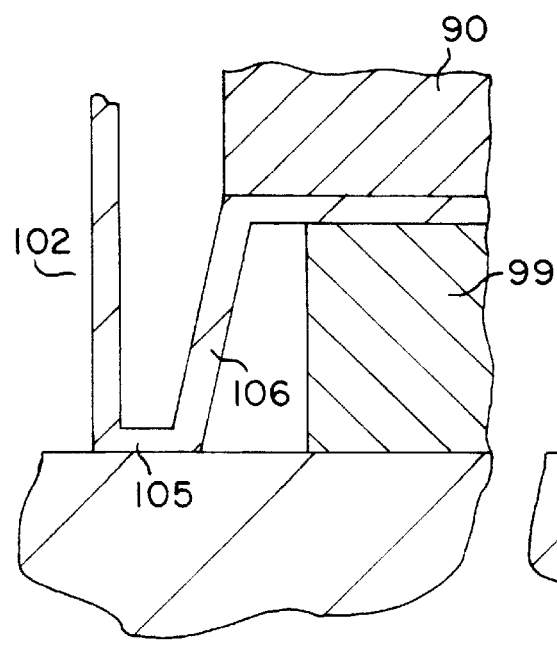
FIG. 19 is an enlarged view of a portion of FIG. 17.
Figure 20:
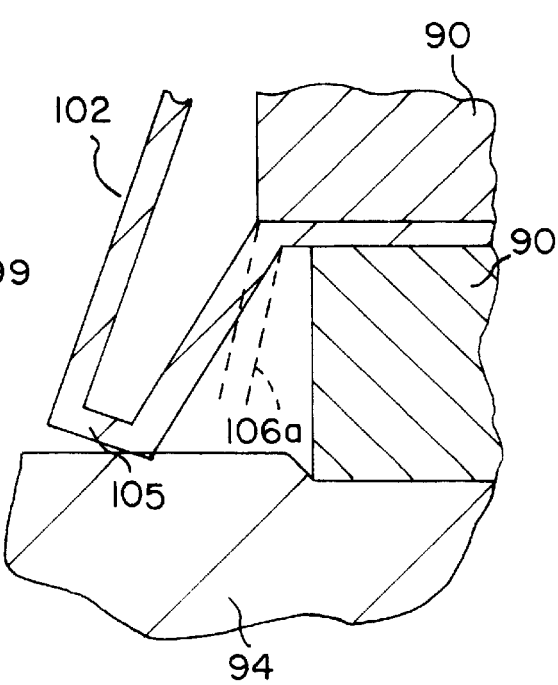
FIG. 20 is an enlarged view of a portion of FIG. 18.

Turning next to the embodiment of the invention shown in FIGS. 17, 18, 19 and 20 it is seen that a bolt 90 having a conventional threaded shank 91 and a nut 92 clamps two substrate members 94 together. The spring washer generally designated 96 of this invention is an apertured element which accepts the shank 91 of bolt 90. An upper washer 98 is provided and, in the illustrated embodiment, there is provided a lower washer 99 which washer element is compressed under fastener load into the substrate 94 as best seen in FIG. 20. The spring washer 96 is provided with a pair of arms 101 and 102 which are joined to the central washer portion by unshaped connections 104 and 105. The diameter of lower washer 99 can be the same as upper washer 98 or of a lesser diameter as seen in FIGS. 19 and 20 without effecting the operation of the spring washer of this invention 106 (FIG. 19) is a portion of the u-shaped connection 105 and 106a (FIG. 20) shows the original position of leg portion 106 before compression of the substrate.

It will be observed than this particular spring washer is very similar to the construction shown in FIG. 11, but the arms amplify the displacement as a result of stress differentials in the base material. The tilt of the arm, which is part of the motion magnification factor, is largely a geometric consideration.

Figure 21:
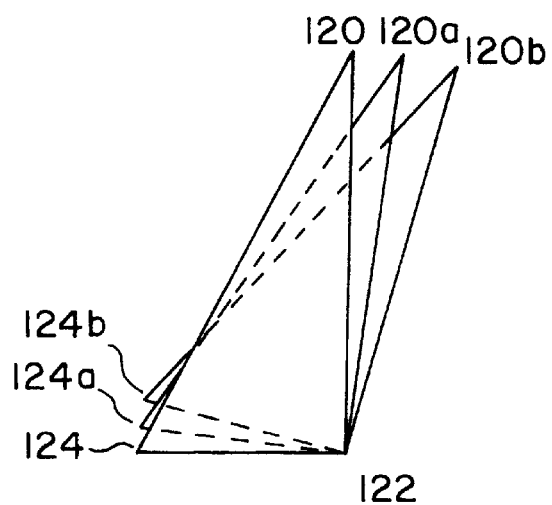
FIG. 21 schematically illustrates the pivoting triangle action found in the embodiments of this invention.
Figure 22:
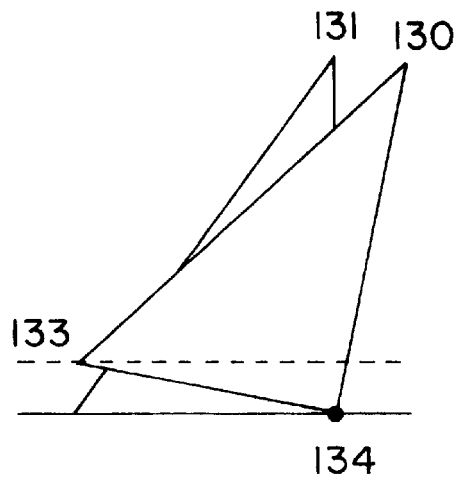
FIGS. 22 and 23 schematically illustrate the effect of substrate compression and the effect of varying base dimension of the triangle.
Figure 23:
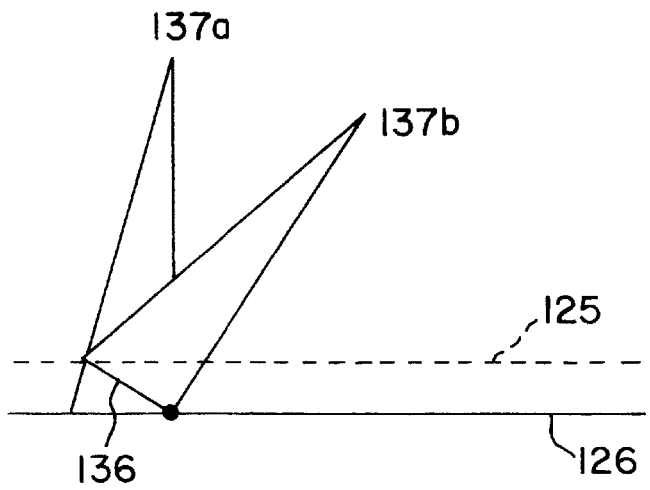

Turning next to FIGS. 21, 22 and 23, the geometry of the invention described herein is considered. FIG. 21 shows three triangles 120, 120a and 120b all of which pivot about a single point 122 to show that the tilting action about a fixed pivot can be achieved. The position of point 122 follows substrate compression whereas points 124 engage the uncompressed substrate.

FIGS. 22 and 23 should be compared for the reason that dotted line 125 and solid line 126 illustrate how two different configurations having general triangular considerations function within the stress differential measuring environment of the present invention. The triangle 130 moves from the position shown at the numeral 131 to the positions shown at 130 when the substrate is depressed by amount between the lines 125 and 126. Point 133 remains on the unstressed portion of the substrate whereas point 134 follows the compressed substrate. Utilizing a triangle with a shorter base 136 produces greater pivotal movement between triangle 137a and 137b and thus serving to indicate the philosophy of the present invention.

In furtherance of the objects of the invention it is seen that I have provided a compartively simple mechanical bolt tension monitor that utilizes differential compression of a substrate as the principal measurement, which differential compression is amplified mechanically and useful with optical, electro-optical and other means to provide the desired interrogation.

Although this invention has been illustrated and described with respect to exemplary embodiments thereof, it should be understood by those skilled in the art that various changes, omissions and additions may be made without departing from the spirit and scope of the invention.

I claim:

1. A reversible fastener tension indicator for use with fasteners which apply a clamp load to a substrate, which indicator continuously monitors, senses and indicates differential substrate distortion between the substrate clamped by the fastener and the unclamped substrate immediately adjacent to the fastener clamped substrate comprising:

a first indicator portion engageable with the substrate upon which the clamp load is exerted so as to follow the distortion of that clamped substrate and a second indicator portion connected to said first indicator portion and intimately engaged with the substrate closely adjacent to the clamp load distorted substrate whereby said second indicator portion moves relative to said first indicator portion and the clamped substrate to indicate reductions in clamp load magnitude.

2. The indicator of claim 1 wherein the first indicator portion includes a rod supported by the fastener whereby said rod follows fastener movement and substrate compression said second indicator portion is a member connected to said rod and moveable relative to said rod about an axis collinear with said rod.

3. The indicator of claim 2 wherein a calibrated washer is disposed between the fastener tension indicator and the substrate to provide a known reference plane said washer is subjected to differential compression by a fastener and engageable with said second indicator portion.

4. The indicator of claim 2 wherein said first indicator portion is a round rod axle extendible into a suitable aperture formed in the fastener and rotatable therein and said second indicator portion is a member having an obliquely angled face whose edge is engageable with said substrate whereby differential compression of said substrate causes engagement of the angled face of said second member with the uncompressed portion of the substrate to effect rotation of said second member.

5. The indicator of claim 4 wherein said second indicator portion includes visible indicia to show the rotated position of said second indicator portion.

6. The indicator of claim 3 wherein the housing is provided to at least partially surround and protect said second indicator portion thereby to permit free movement thereof, said housing being engageable with the calibration washer and being provided with flat faces on the sides of the housing not including the second indicator portion to permit engagement with a tool.

7. The indicator of claim 4 wherein a resilient member is provided to establish a return force for the second indicator portion.

8. The fastener tension indicator of claim 1 wherein said first indicator portion is a flat portion upon which the clamp load is exerted by a fastener and said second indicator portion is connected at an elbow to said first portion and to a third portion, said third portion having a tip engageable with the substrate closely adjacent the clamp load distorted substrate, whereby said third portion and said second portion pivots about the connection elbow provide an indication of differential substrate distortion.

9. The fastener tension indicator of claim 8 wherein said first indicator portion, said second indicator portion and said third indicator portion are formed from a single piece of suitable sheet material and the third portion is reversely bent on said second portion to present a distal end engageable with the substrate closely adjacent to the clamp load distorted substrate.

10. The fastener tension indicator of claim 8 wherein an apertured pivot washer member is provided to be interposed between the first indicator portion and the fastener for exerting a clamp load on the substrate, said washer being a truncated cone profile to present a bottom edge about which the second portion pivots under clamp load.

11. The fastener tension indicator as set forth in claim 8 wherein a plurality of first indicator and second indicator portions are distributed about the circumference of a unitary washer, each of those portions having second portion and reversibly bent third portions to provide plural indications of the differential substrate distortion.

12. The fastener tension indicator of claim 11 wherein a lower calibration washer the lower calibration washer having a larger diameter than the pivot washer and an upper pivot washer are provided, the first indicator portions being engageable with said calibration washer, said calibration washer being subjected to differential distortion over its radius thereby to indicate fastener tension and fastener clamp load by the movement of a plurality of said second portions about the pivot edge of said pivot washer.

13. The fastener tension indicator of claim 1 wherein said first indicator portion and the second indicator portion are connected by a generally u-shaped connection whereby the second indicator portion pivots about the u-shaped connection as the first indicator portion follows the distortion of the substrate under clamp load.

14. The fastener tension indicator of claim 1 wherein said first indicator portion is a flat portion upon which the clamp load is exerted by a fastener and said second indicator portion is connected at an elbow to said first portion and to a third portion, said third portion having a tip engageable with the substrate closely adjacent the clamp load distorted substrate, whereby said third portion and said second portion pivots about the connection elbow provide an indication of differential substrate distortion.

15. A fastener tension indicator system comprising a substrate to be clamped, a headed fastener having a shank received in a suitable aperture in the substrate, a cooperating element engageable with the shank to exert a clamping force on the substrate to produce differential distortion between the clamped portion of the substrate and the substrate closely adjacent thereto, means for indicating differential substrate distortion between the substrate clamped by the fastener and the unclamped substrate immediately adjacent to the fastener clamped substrate said means comprising an axle extending into a suitable aperture formed in the headed fastener, an indicator secured to said axle and engageable with the unclamped substrate, said indicator having a foot with an obliquely angled face which engages said unclamped substrate whereby said indicator rotates upon differential compression of said substrate.

16. The tension indicator system of claim 15 wherein a protective shell engages the said headed fastener, the shell having flat surfaces permitting tool engagement, one surface being removed in the area of said second indicator portion so as to permit operation thereof under differential substrate compression.

17. The tension indicator of claim 16 wherein a calibrated washer apertured to accept the fastener shank is provided between the substrate and the fastener head, the calibrated washer experiencing compression under the head of the fastener and providing unclamped washer substrate portion closely adjacent thereto.

18. The fastener tension indicator system of claim 17 wherein resilient means are provided for restoring the indicator upon decrease in fastener tension in clamp load.

19. The fastener tension indicator of claim 18 wherein an extension constructed of suitable material is provided at the juncture of said second and third portions of said indicator so as to provide a longer radius arm to permit increased indication of differential substrate distortion without interfering with the action of the indicator.

20. A fastener tension indicator system comprising a headed fastener having a shank received in a suitable aperture in the substrate a cooperating element engageable with said shank to exert a clamping force on the substrate to produce differential distortion between the clamped portion of the substrate and the substrate closely adjacent thereto, means for continuously indicating differential substrate distortion between said substrate clamped by the fastener and the unclamped substrate immediately adjacent to the clamped substrate, said means comprising a first flat indicator portion upon which the clamp load is exerted by a fastener, a second indicator portion connected at an elbow to said first portion and also to a third portion, said third portion having a tip engageable with the substrate closely adjacent the clamp load distorted substrate, whereby said third portion and said second portion pivot about the connection elbow provide an indication of change in differential substrate distortion.

21. The fastener tension indicator of claim 20 wherein a washer is interposed between the first indicator portion and the substrate to be compressed whereby the first portion follows the lower washer into the distorted substrate and the u-shaped connection remains in contact with the substantially undisturbed substrate thereby to pivot the outer arm of the u-shaped member through a greater displacement to provide an amplified visual indication of the differential substrate distortion between the unclamped substrate adjacent to the fastener and the distorted substrate under the washer.

* * * * *